Sept. 19, 1967          J. PINKAVA          3,342,342

CONTINUOUS BELT-TYPE FILTER CENTRIFUGE

Filed July 6, 1965

INVENTOR.
Jan Pinkava

BY

Michael J. Striker

United States Patent Office 3,342,342
Patented Sept. 19, 1967

3,342,342
CONTINUOUS BELT-TYPE FILTER CENTRIFUGE
Jan Pinkava, Zilina, Czechoslovakia, assignor to Ceskoslovenska akademie ved, Prague, Czechoslovakia
Filed July 6, 1965, Ser. No. 469,563
Claims priority, application Czechoslovakia,
July 4, 1964, 3,867/64
11 Claims. (Cl. 210—370)

ABSTRACT OF THE DISCLOSURE

An endless toroid filter band wound through pairs of slots in end walls of a pair of filter drums having slanted axes, is continuously moved due to the wobbling motion of one of the drums during rotation.

---

Figure 1:
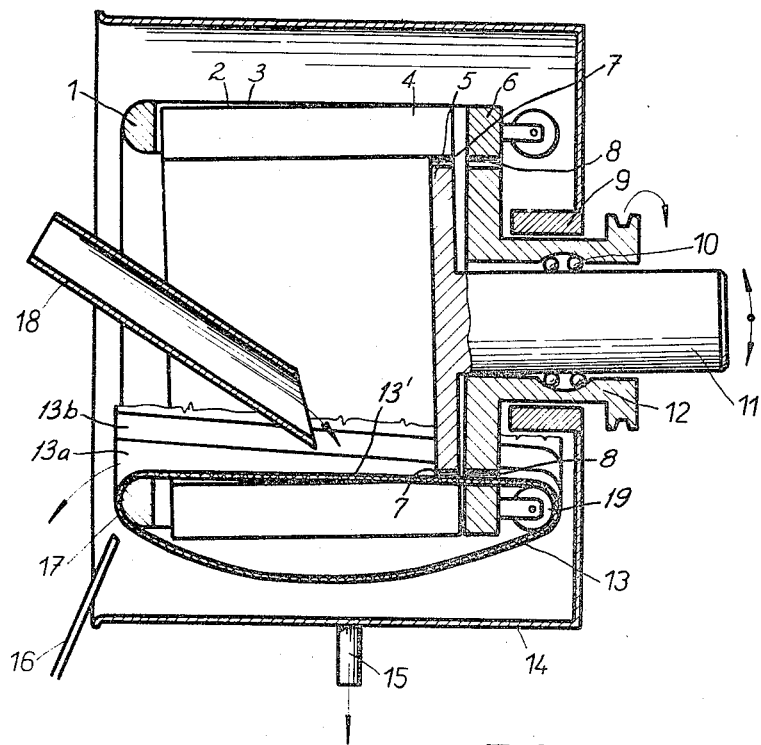

The invention relates to a continuous filter centrifuge with a filter fabric, especially suitable for separating and washing suspensions and gels which can be filtered only with difficulty.

Continuous filter centrifuges known hitherto can be used only for separating coarse-grain solids from liquids. Fine suspensions, which are difficult to filter, can be separated only by means of discontinuous centrifuges or filter-presses. The use of discontinuously separating filter devices is, however, time consuming, the filter fabrics being comparatively soon clogged so that the filtration must often be interrupted.

Said disadvantages are removed by the present invention. A continuous filter centrifuge according to the invention comprises outer and inner bar drums, the mantles or tubular parts of which are formed by two sets of bars which are mutually engaging, thus forming the common circumferential wall or mantle of the centrifuge. The axis of one drum is diverging with regard to the other, i.e., the two drum axes are either concurrent or skew like as in the known Furness cylinder for spinning rayon. The drums of the centrifuge according to the invention have, however, their end walls on one side only, the other end being left open. The shaft of the inner drum passes through the hollow shaft of the outer drum, preferably so that it can be inclined in order to change the divergence between the two shafts. The end walls of the two drums are provided with slots, which are substantially tangential and mutually staggered so that a band of filter fabric can be drawn through them and wound toroidally around the centrifuge mantle, with its ends joined, forming thus, a coherent filter surface.

As a result of the divergence of the two drum axes the toroid filter fabric band is moved inside of the centrifuge drum from its bottom to the edge, returning outside of the drum to the bottom of the drum face again, the revolving movement being quite smooth and continuous. On its way through the inside of the drum the filter fabric is charged first with the suspension to be filtered and then with a washing liquid or liquids. The mother-lye and the washing liquids can be, if desired, caught in a surrounding ring trough arranged outside of the centrifuge. The separated solid is thrown by centrifugal force over the edge and caught in a separate trough, from which it is removed in usual way, e.g., by a discharge chute. The velocity of the moving toroidal filter band depends on the divergence of the drum axes and can be conveniently controlled by inclining one axis with regard to the other.

The centrifuge according to the invention makes possible a fully continuous filtration and washing of very fine suspensions and gels. Solids separated from the liquid and caught on the filter band can be easily washed while still on said band; they are, after the washing liquid has been changed to centrifuged off, automatically and continuously discharged. The separated mother-lye and washing liquids may be withdrawn individually, if desired. The filter fabric band can be made of any suitable material such as of cotton or other natural fibres, of rayon, of synthetic filaments, glass filaments or fine metal wire.

Figure 2:
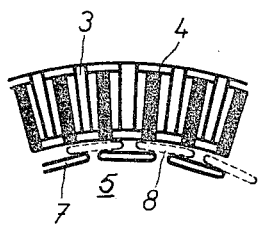
Figure 3:
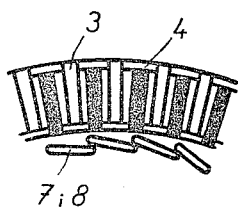

The annexed drawing illustrates diagrammatically an example of the continuous filter centrifuge according to the invention. FIG. 1 shows the device in vertical axial-section, the upper portion of the filter band being omitted for the sake of clarity. FIGS. 2 and 3 are partial cross sections of the bar-drum showing sections of the two sets of mutually engaging bars, together with staggered slots in the drum end walls.

On FIG. 1, the centrifuge in its simplest embodiment consists of two rotating bar-drums 1, 2, where inside of the driven outer drum 1 is placed the inner drum 2, which may be either also driven or simply taken along by the bars 3 of the driven outer drum 1 alternating with the bars 4 of the inner drum 2. The mantles of the two drums consist of bars 3, 4, the bars of one drum engaging between the bars of the other drum, and the ends of bars 3 of the outer drum 1 being connected by a guide ring 17. In the end wall 5 of the inner drum 2 there are oblong slots 7, respectively placed opposite to slots 8 made in the end wall 6 of the outer drum 1 to form pairs, said slots being substantially tangential. The end wall 5 of the inner drum 2 is coaxially connected with the shaft 11, which passes through at least one adjustable bearing 10, placed inside of the hollow shaft 12 of the outer drum 1. Said hollow shaft is provided with any kind of driving means such as a pulley and is supported by a bearing 9, which may be of any suitable type. The axes of the two drums and their shafts are divergent, i.e., the axis of one shaft is slanted to the axis of the other, as shown with an enlarged angle in the drawing, their angle being adjustable by setting the inner drum shaft 11 in the direction of arrows by any appropriate means not shown in the drawings, such as by a lever, a screw, an endless screw, a gearing or similar means. The same effect may be obtained by displacing the outer shaft with respect to the inner shaft, or, if desired by swinging both of them simultaneously in any suitable planes.

The endless filter fabric band 13 is wound through adjacent pairs of slots 7, 8 in drum end walls 5 and 6 so as to form a toroidal coil tightly adhering to the inner surface of the centrifuge mantle. The toroid band 13, its windings 13a, 13b mutually overlapping, forms a coherent surface 13' of fabric pressed by centrifugal force against the bar-drum and pushed by intermittently extending bars of the inner bar-drum upwards over the rounded guide ring 17, where the separated solids are thrown off. The toroidal band passes then outside the drum, where it may be supported, if desired, by non-illustrated means such as fixed circumferential wire or bar made of metal or plastics, and returns, preferably over a series of rollers 19 or over a rounded edge of the outer drum bottom, through the next pair of slots 7, 8 into the inside of the centrifuge again, etc. In this way the filter fabric band is entirely wound around the doubled bar-drum system 1, 2, thus forming a closed toroid coil. Due to the slanted position of drum 2, each of its bars 4 moves toward the right, as viewed in FIG. 1, while moving from the top position to the lowest position, and toward the left when moving from the lowest position to the top position during each revolution. Since the top windings (not shown) of band 13 abut the highest bars 4 of the inner drum 2, they are pushed by the same toward and over the rounded edge 7. The lower windings abut bars 3 of drum 1 which do not reciprocate in axial direction. Consequently, band 13 is screwed through the pairs of slots 7, 8.

In the embodiment of FIG. 2, the slots 7, 8 of each pair are staggered in radial and circumferential directions. In the embodiment of FIG. 3 the slots 7, 8 of each pair are axially aligned.

The two bar-drums 1, 2 may be, if desired, seated in a housing 14 provided with one or more discharging pipes 15 for the mother-lye and washing liquids, and with a discharge chute 16. The suspension to be filtered is led in through the filling pipe 18. Washing liquid or liquids are similarly led in through further pipes not shown in the drawing.

The centrifuge can be arranged either in horizontal or in vertical position of the rotation axis, or if desired, with its axis inclined in any suitable angle. Individual separated liquids can be caught and discharged by individual circular troughs arranged in appropriate distances outside the centrifuge drum.

If desired, the housing 14 may be covered by a lid not shown in the drawing and filled up with inert gas.

It is also possible to fill in near the bottom of the drum first a suspension of filtering solid particles such as charcoal, silica gel, diatomaceous earth or similar material, and then the suspension to be filtered in a zone more distant from the bottom. In this way the suspension to be filtered is applied onto the layer of charcoal or similar material and the filtering effect is enhenced. This method is suitable e.g. for separating solids which are subsequently dissolved in another liquid and thereby separated from the auxiliary filter substance.

The bearings of the inner drum 2 are preferably displaced, when changing the velocity of the toroidal filter band, in such a way that the dynamic equilibrium of this centrifuge is not disturbed. For this purpose the simultaneous displacement of both inner and outer drum shafts is more suitable, as the swinging of the drum axes around the gravity center can be more easily achieved.

What I claim is:

1. A filter centrifuge comprising, in combination, a first outer drum rotatable about a first axis and having a first end wall, a circular row of circumferentially spaced first bars projecting from said first end wall, and guide means at the free ends of said first bars; a second inner drum having a second axis slanted to said first axis and having a second end wall located within said first bars adjacent said first end wall, and a circular row of second circumferentially spaced bars projecting from said second end wall, said second bars being located between said first bars so that said first and second drums are connected for rotation together, said second bars reciprocating in axial direction during each revolution of said first and second drums due to the slant of said second axis, said end walls having, respectively, first and second sets of tangential circumferentially spaced slots, pairs of first and second slots being located in the proximity of each other; and an endless filter band having a plurality of overlapping windings passing through said pairs of slots and over said guide means to form a toroid coil, the inner portions of said windings abutting some of said second bars and being pushed by the same toward and over said guide means during one reciprocating stroke of said second bars so that said filter band is screwed through said pairs of slots and changes its position when said first and second drums rotate during a filtering operation.

2. A filter centrifuge as claimed in claim 1 wherein said guide means is a guide ring having a rounded-off surface for guiding the moving windings; and wherein said first bars extend parallel to said first axis and said second bars extend parallel to said second axis.

3. A filter centrifuge as claimed in claim 2 comprising rollers mounted on said first end wall for guiding said windings of said filter band.

4. A filter centrifuge as claimed in claim 1 comprising a first hollow shaft secured to said first end wall, and a second shaft secured to said second end wall and located in said first hollow shaft, said first and second shafts having said first and second axes so that said second shaft is slanted to said first shaft.

5. A filter centrifuge as claimed in claim 4 comprising bearing means in said first shaft supporting said second shaft.

6. A filter centrifuge as claimed in claim 5 wherein said bearing means supports said second shaft for angular movement relative to said first shaft so that the slant of said second shaft and the angle between said first and second axes can be adjusted.

7. A filter centrifuge as claimed in claim 1 comprising means for adjusting the relative position between said first and second drums so that the angle between said first and second axes is adjusted.

8. A filter centrifuge as claimed in claim 1 wherein said first and second slots of each pair are staggered and overlapping in circumferential direction.

9. A filter centrifuge as claimed in claim 1 wherein said first and second slots of each pair are aligned in axial direction.

10. A filter centrifuge as claimed in claim 1 comprising first and second bearing means for said first and second drums mounting the same for rotation about first and second axes located in a common plane and defining an acute angle in said common plane.

11. A filter centrifuge as claimed in claim 1 and comprising a housing surrounding said drums and having a discharge outlet, and inlet means for supplying a substance into the space surrounded by said circular rows of first and second bars.

References Cited

UNITED STATES PATENTS

| 1,280,469 | 10/1918 | Hiller | 210—400 X |
| 1,309,651 | 7/1919 | Mulet | 210—370 |
| 1,767,905 | 6/1930 | Walker | 210—400 X |
| 1,846,168 | 2/1932 | Webb | 210—369 |
| 1,988,794 | 1/1935 | Hill | 210—370 X |
| 2,416,073 | 2/1947 | Smely | 210—401 |

FOREIGN PATENTS

| 691,923 | 6/1940 | Germany. |
| 27,782 | 3/1917 | Norway. |

REUBEN FRIEDMAN, *Primary Examiner.*

F. SPEAR, *Assistant Examiner.*